(12) United States Patent
Di Vita et al.

(10) Patent No.: US 11,728,595 B2
(45) Date of Patent: Aug. 15, 2023

(54) GROUND FAULT CIRCUIT INTERRUPTERS AND CONNECTORS FOR USE WITH SAME

(71) Applicant: Hubbell Incorporated, Shelton, CT (US)

(72) Inventors: Antonio Di Vita, Shelton, CT (US); Michael Nagy, Fairfield, CT (US); Kenny Padro, Hamden, CT (US)

(73) Assignee: Hubbell Incorporated, Shelton, CT (US)

( * ) Notice: Subject to any disclaimer, the term of this patent is extended or adjusted under 35 U.S.C. 154(b) by 211 days.

(21) Appl. No.: 17/154,412

(22) Filed: Jan. 21, 2021

(65) Prior Publication Data

US 2021/0226389 A1   Jul. 22, 2021

Related U.S. Application Data

(60) Provisional application No. 62/964,307, filed on Jan. 22, 2020.

(51) Int. Cl.
| | |
|---|---|
| *H02H 3/16* | (2006.01) |
| *H01R 13/713* | (2006.01) |
| *H01H 71/12* | (2006.01) |
| *H01R 25/00* | (2006.01) |
| *H01R 24/78* | (2011.01) |

(52) U.S. Cl.
CPC ......... *H01R 13/7135* (2013.01); *H01H 71/12* (2013.01); *H01R 24/78* (2013.01); *H01R 25/006* (2013.01); *H02H 3/16* (2013.01)

(58) Field of Classification Search
CPC ............ H01R 13/7135; H01R 13/6658; H01R 4/4818; H01R 13/6271; H01R 13/648; H01R 13/652; H01R 24/62; H01R 13/60; H02H 3/16; H01H 71/121; H01H 83/14; H01H 83/144
USPC ....................................... 361/42–50
See application file for complete search history.

(56) References Cited

U.S. PATENT DOCUMENTS

| | | | |
|---|---|---|---|
| 3,120,985 A | 2/1964 | Hubbell | |
| 7,736,175 B1* | 6/2010 | Savicki, Jr. .......... | H01R 25/006 439/535 |
| 2010/0029126 A1 | 2/2010 | Ngo | |
| 2010/0304624 A1* | 12/2010 | Montalbano .......... | H01R 4/505 439/775 |
| 2013/0215542 A1 | 8/2013 | Benoit et al. | |
| 2016/0020597 A1 | 1/2016 | Bonasia et al. | |

OTHER PUBLICATIONS

PCT/US2021/014341 International Search Report and Written Opinion dated May 25, 2021 (18 pages).

* cited by examiner

*Primary Examiner* — Danny Nguyen
(74) *Attorney, Agent, or Firm* — Michael Best & Friedrich LLP

(57) ABSTRACT

A connector for use with a GFCI receptacle is provided. The connector includes a body, a latch configured to couple the body to the GFCI receptacle, a first blade supported by and extending from the body, a second blade supported by and extending from the body, wherein when the body is coupled to the GFCI receptacle, the first blade is received by a first mating terminal of the GFCI receptacle and the second blade is received by a second mating terminal of the GFCI receptacle to electrically couple the receptacle to a downstream device.

20 Claims, 14 Drawing Sheets

GROUND FAULT CIRCUIT INTERRUPTERS AND CONNECTORS FOR USE WITH SAME

CROSS-REFERENCE TO RELATED APPLICATIONS

This application claims the benefit of co-pending, prior-filed U.S. Provisional Patent Application No. 62/964,307, filed Jan. 22, 2020, the entire contents of each are incorporated by reference.

FIELD

Embodiments relate to switched electrical devices.

SUMMARY

Switched electrical devices, such as but not limited to circuit interrupting device (for example, ground fault circuit interrupters (GFCI) and/or arc fault circuit interrupters (AFCI)) are configured to switch to a "tripped" or unlatched state from a "reset" or latched state when one or more conditions are detected.

In one embodiment, a receptacle includes a housing enclosing a circuit interrupting device. The housing includes a front cover having a duplex outlet face and a rear cover having a first aperture adjacent a first end and a pair of apertures adjacent a second end. The receptacle further includes a first set of terminals positioned within the housing and accessible through duplex outlet face, a second set of terminals positioned within the housing and accessible through the duplex face, a third set of terminals positioned within the housing and accessible through the first aperture, and a fourth set of terminals positioned within the housing, each of the fourth set of terminals being accessible through one of the pair of apertures. A first connector is removably coupleable to the receptacle to selectively couple electric power to the receptacle. The first connector includes terminals that are complementary to and electrically and physically coupleable to one of each of the third set of terminals. A second connector is removably coupleable to the receptacle to selectively electrically couple the receptacle to one or more downstream devices. The first connector includes terminals that are complementary to and electrically and physically coupleable to one of each of the fourth set of terminals.

In another embodiment, a connector is provided for selectively electrically coupling a GFCI receptacle to one or more downstream devices. The connector includes a body, a pair of L-shaped blades configured to be received by female terminals positioned within the GFCI receptacle, and a pair of latch mechanisms positioned on opposite sides of the body that are configured to couple the body to GFCI receptacle.

In another embodiment, a connector for use with a GFCI receptacle is provided. The connector includes a body, a latch configured to couple the body to the GFCI receptacle, a first blade supported by and extending from the body, a second blade supported by and extending from the body, wherein when the body is coupled to the GFCI receptacle, the first blade is received by a first mating terminal of the GFCI receptacle and the second blade is received by a second mating terminal of the GFCI receptacle to electrically couple the receptacle to a downstream device.

In another embodiment, a receptacle includes a housing enclosing a circuit interrupting device. The housing includes a front cover having a duplex outlet face and a rear cover, the rear cover having a first aperture and a second aperture. The receptacle includes one or more first sets of terminals positioned within the housing and accessible through duplex outlet face, a second set of terminals positioned within the housing and configured to input electrical power to the receptacle from a power source, a third set of terminals positioned within the housing. The third set of terminals are configured to provide ground fault protection to a downstream device, and the third set of terminals includes a first terminal that is accessible through the first aperture and a second terminal that is accessible through the second aperture.

In another embodiment, a receptacle assembly including a housing enclosing a circuit interrupting device. The housing includes a front cover having a duplex outlet face and a rear cover. The rear cover has a first aperture and a second aperture. The receptacle includes one or more first sets of terminals positioned within the housing and accessible through duplex outlet face, a second set of terminals positioned within the housing and configured to input electrical power to the receptacle from a power source, a third set of terminals positioned within the housing. The third set of terminals is configured to provide ground fault protection to a downstream device, and the third set of terminals includes a first terminal that is accessible through the first aperture and a second terminal that is accessible through the second aperture. A is connector removably coupleable to the housing to electrically couple the receptacle to one or more downstream devices. The connector includes a first terminal and a second terminal. The first terminal is complementary to one of the first and second terminals of the third set of terminals and the second terminal is complementary to the other of the first and second terminals of the third set of terminals.

Other aspects of embodiments detailed below will become apparent by consideration of the detailed description and accompanying drawings.

DETAILED DESCRIPTION

Before any embodiments are explained in detail, it is to be understood that the application is not limited in its application to the details of construction and the arrangement of components set forth in the following description or illustrated in the following drawings. Other embodiments, than those described below, are capable of being practiced or of being carried out in various ways.

Figure 1:
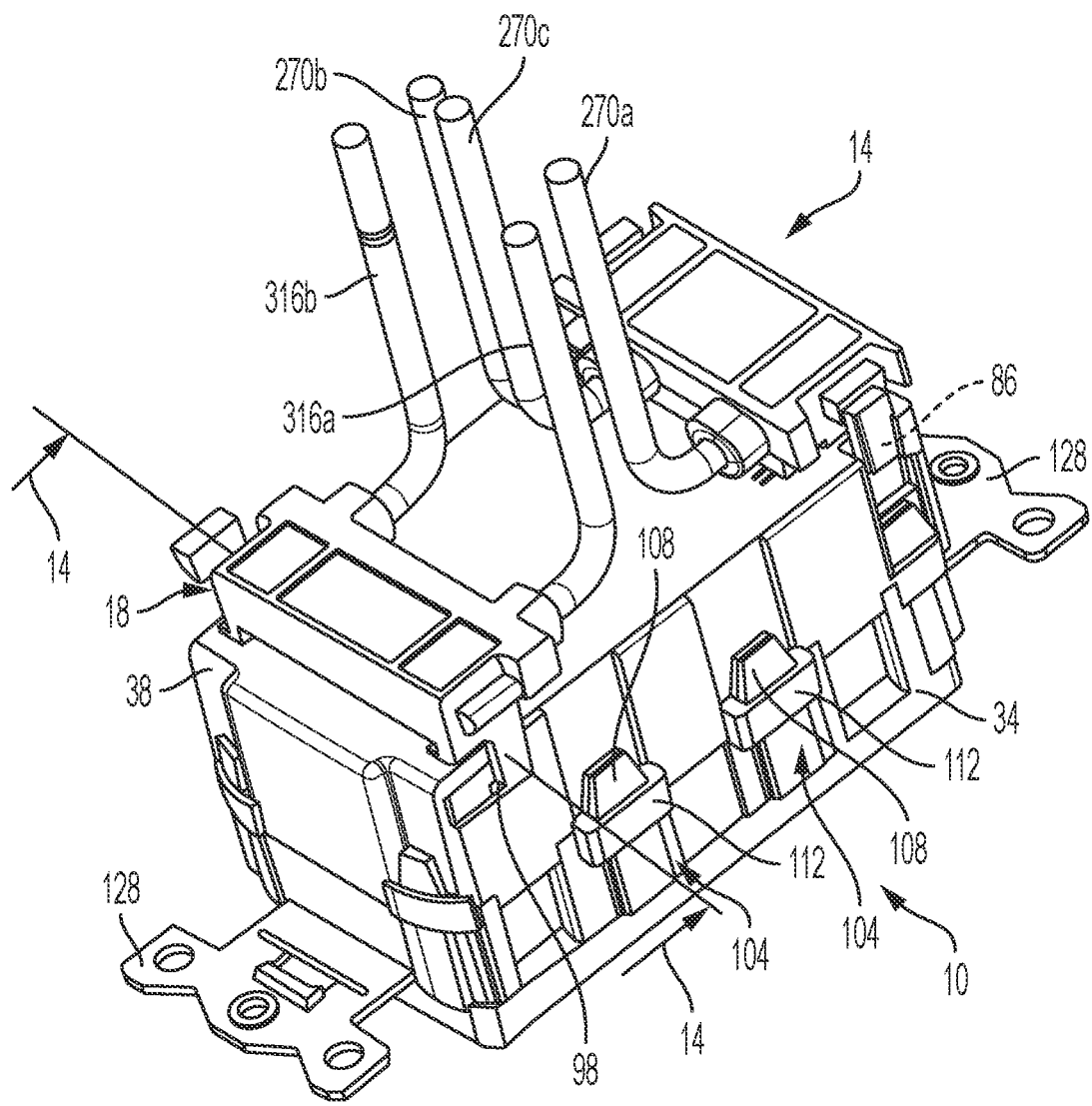
FIG. 1 is a perspective view of a receptacle including a first connector and a second connector coupled thereto according to one embodiment.

FIG. 1 is a rear perspective view of a receptacle 10, a first connector 14 (e.g., line connector, upstream connector), and a second connector 18 (e.g., load connector, downstream connector). The first and second connectors 14, 18 are coupleable to the receptacle 10.

Figure 2:
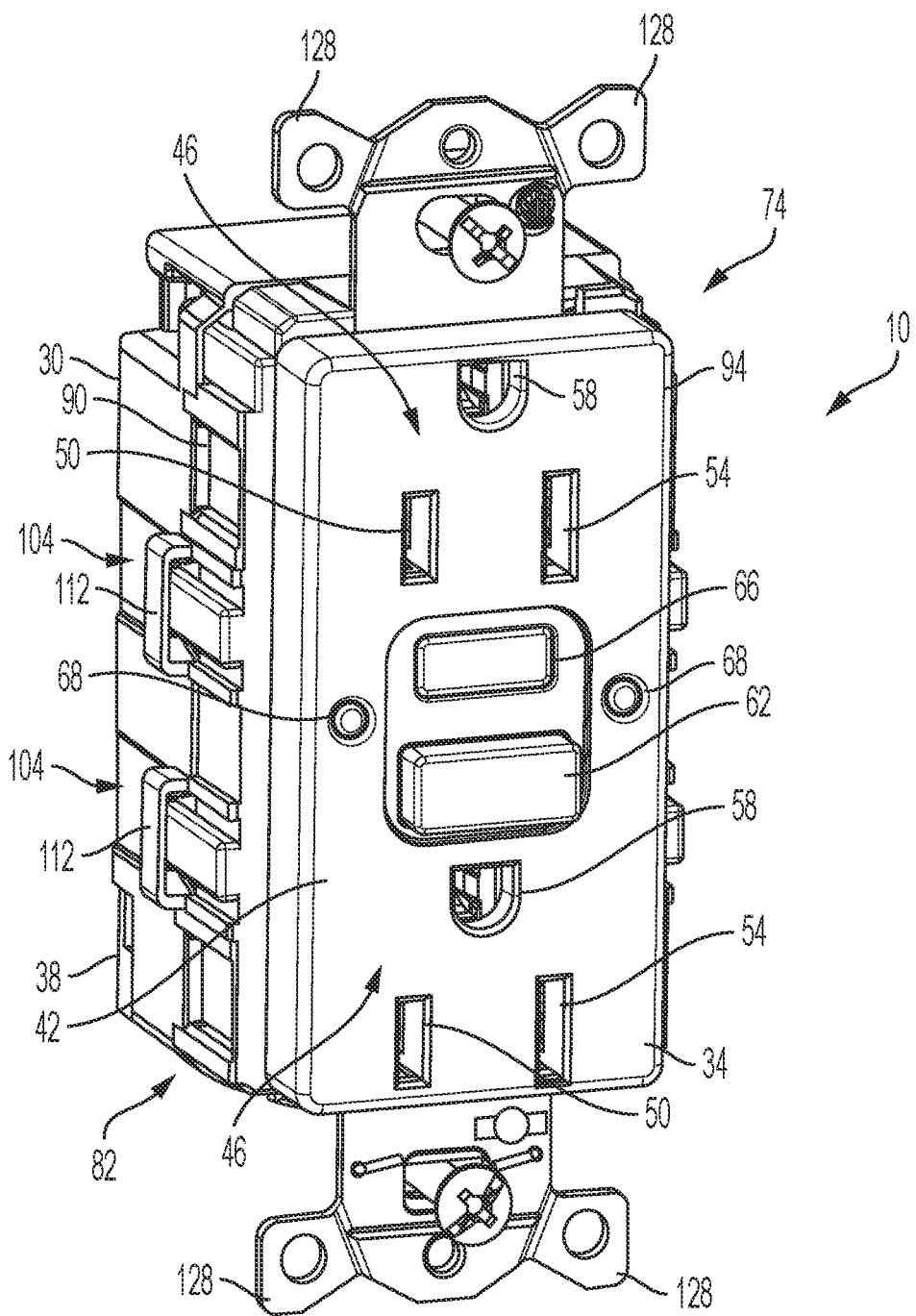
FIG. 2 is a front perspective view of the receptacle of FIG. 1.
Figure 3:
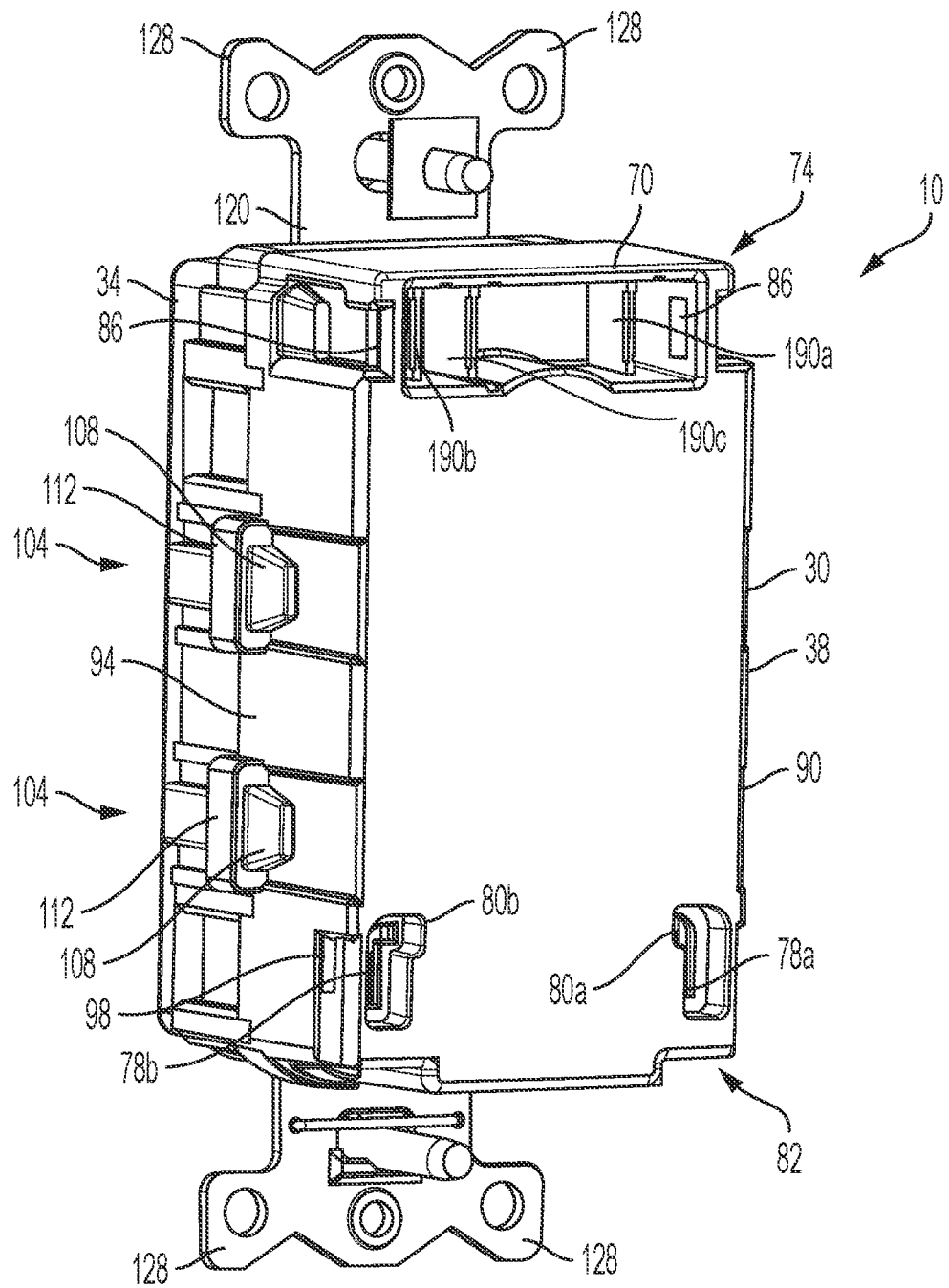
FIG. 3 is a rear perspective view of the receptacle of FIG. 1.
Figure 4:
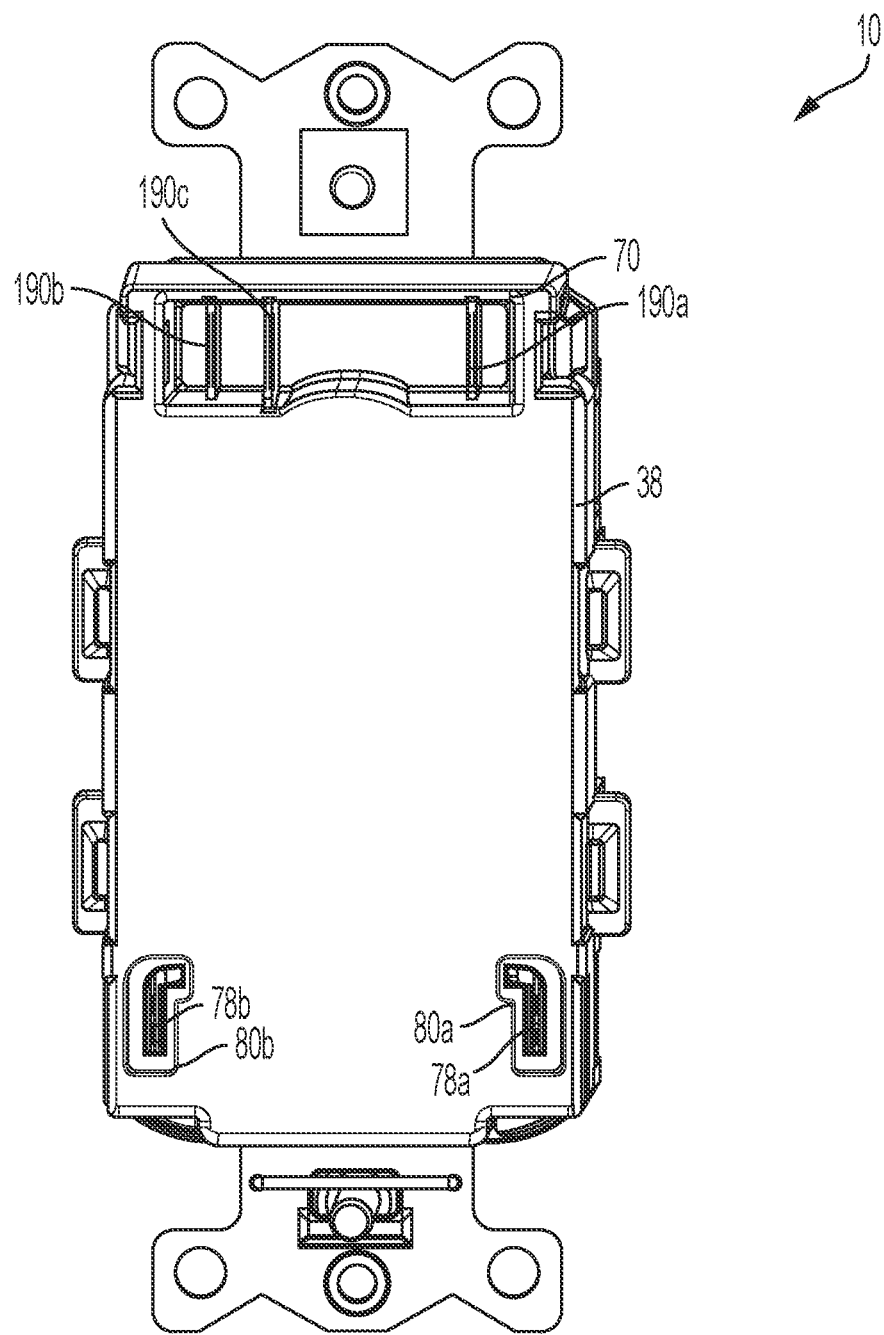
FIG. 4 is a rear view of the receptacle of FIG. 1.

With respect to FIGS. 2-4, the receptacle 10 includes a circuit interrupting device according to some embodiments. The receptacle 10 includes a housing 30 having a front cover 34 and a rear cover 38. The housing 30 may be formed of plastic, or a similar material. The front cover 34 may include a duplex outlet face 42 with two sets of openings 46, each having a hot phase opening 50, a neutral opening 54, and a ground opening 58. The face 42 may further include openings accommodating a RESET button 62, a TEST button 66, and one or more light emitting diodes 68 (LEDs). Although not illustrated, in some embodiments, the face 42 may include additional openings to accommodate additional buttons, as well as additional openings to accommodate various indicators (for example, buzzers, night lights etc.). With respect to at least FIG. 3, the rear cover 38 includes a first aperture 70 adjacent a first end 74 and a pair of apertures 78a, 78b adjacent a second, opposite end 82. The pair of apertures 78a, 78b in the rear cover 38 are substantially L-shaped and are sized and shaped such that a standard wire is too large to be inserted therein. The pair of apertures 78a, 78b are each positioned within a similarly shaped L-shaped recess 80a, 80b. As shown, each of the apertures 78a, 78b and the pair of recesses 80a, 80b have a substantially 90 degree bend between a first end and a second end thereof. The rear cover 38 also includes a first pair of apertures or pockets 86 that extend through opposite side 90, 94 of the rear cover 38 and a second pair of apertures or pockets 98 that extend through the opposite sides 90, 94 of the rear cover 38. The first pair of pockets 86 is positioned is adjacent the first end 74 and the second pair of pockets 98 are adjacent the second end 82.

With respect to FIGS. 1-3, the rear cover 38 is secured to front cover 34 by fasteners 104. For example, each fastener 104 may include a barbed post 108 on front cover 34 and corresponding resilient hoop 112 on rear cover 38, similar to that which is described in detail in U.S. Pat. No. 6,398,594, the entire contents of which are incorporated herein by reference for all that is taught. In the illustrated embodiment, there are eight fasteners, although more or less than eight fasteners can be used in other embodiments.

Figure 5:
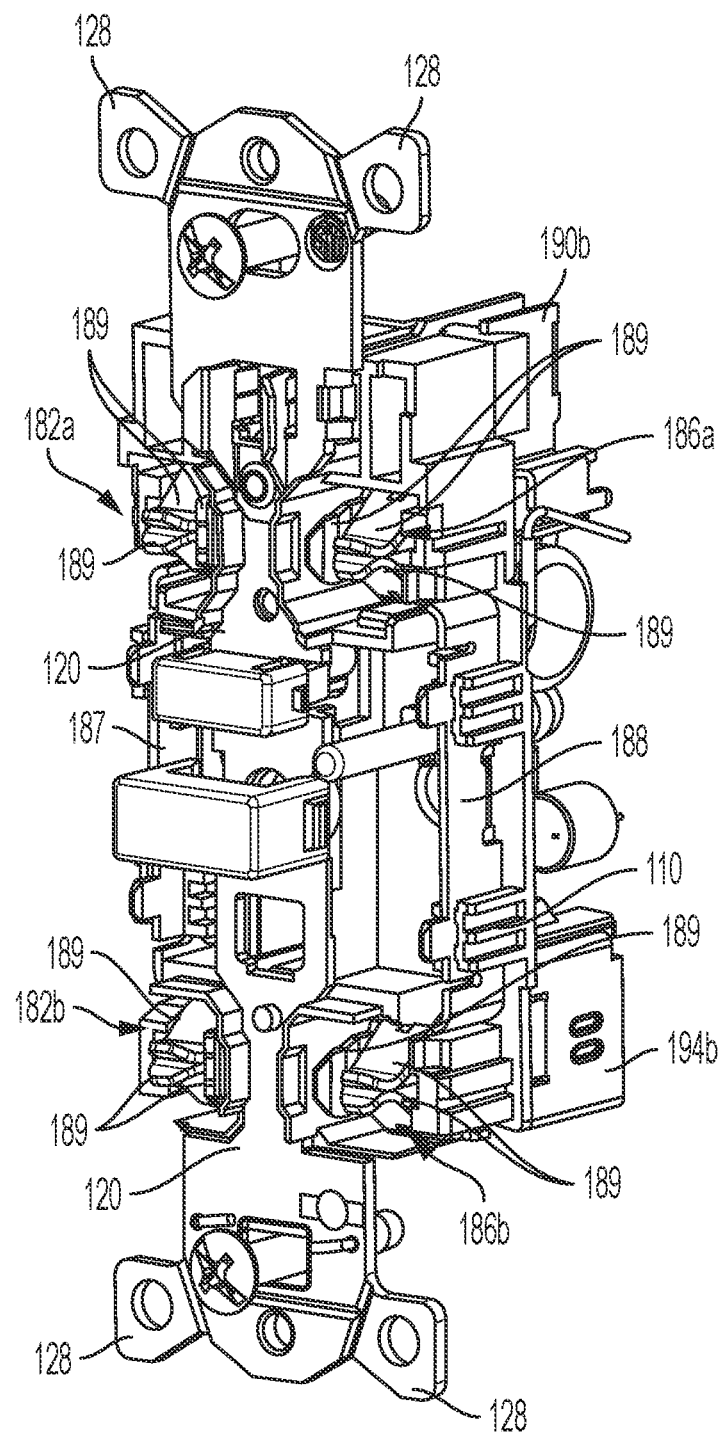
FIG. 5 is a front perspective view of the receptacle of FIG. 1 with front and rear covers removed.
Figure 6:
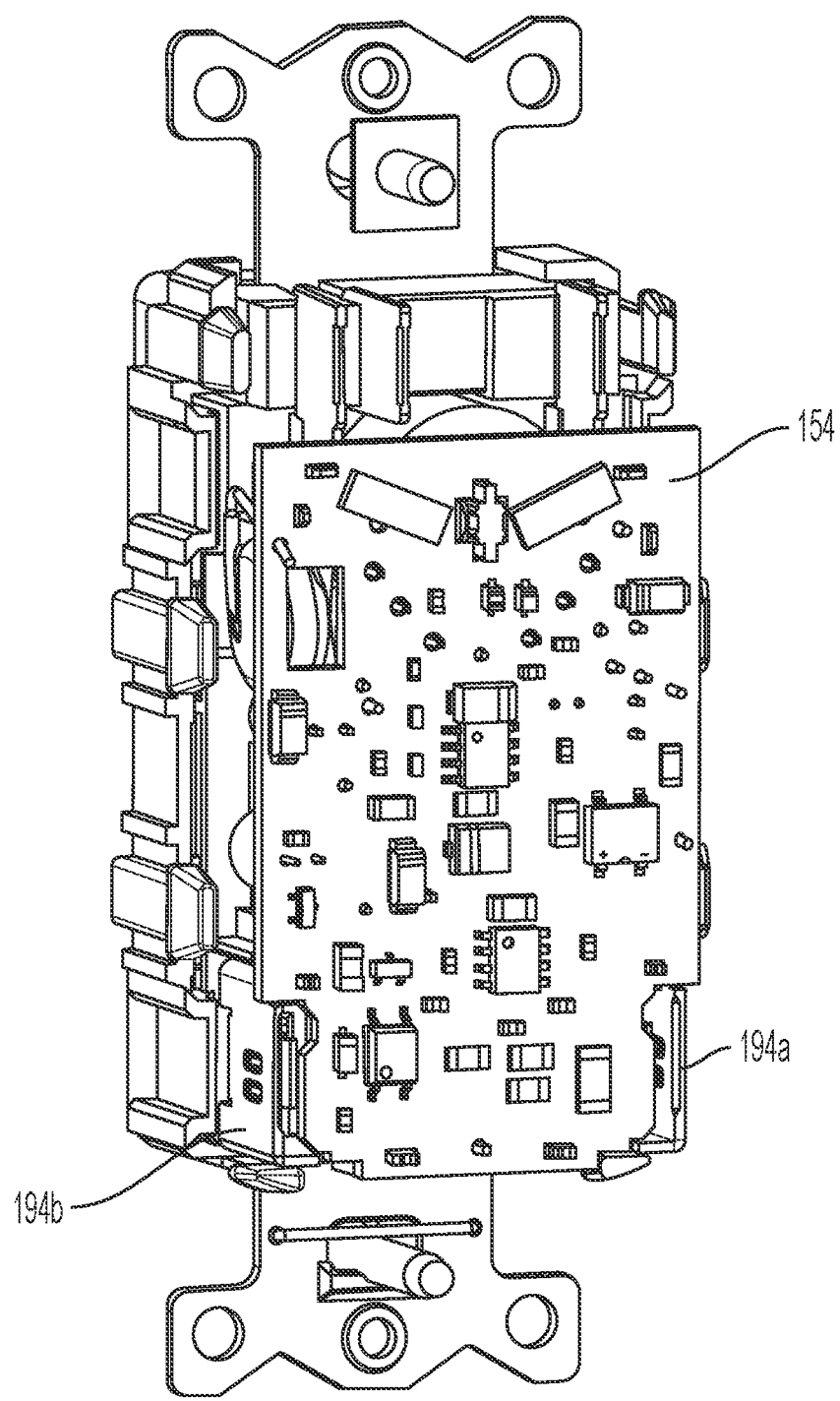
FIG. 6 is a rear perspective view of the receptacle of FIG. 1 with the front and rear covers removed.

As shown in FIG. 5, contained within the front and rear covers 34, 38 is a manifold or barrier 110 that provides support for a yoke/bridge assembly 120 configured to secure the receptacle 10 to an electrical box (not shown). The ground yoke/bridge assembly 120 has standard mounting ears 128 that protrude from the ends 74, 82 of receptacle 10.

FIGS. 6-8B illustrate perspective views of a core assembly 150 (FIG. 8B) according to some embodiments. The core assembly 150 is configured to support a printed circuit board 154 that supports most of the working components of the receptacle 10, including the control system. A first conductor arm 158a and a second conductor arm 158b are in communication with the printed circuit board 154 and configured to supply electrical power to the receptacle 10 and to downstream receptacles. The first conductor arm 158a is the hot line conductor and the second conductor arm 158b is the neutral line conductor. The first conductor arm 158a has a hot line contact 160 and a hot load contact 161, and the second conductor arm 158b includes a neutral line contact 162 and a neutral load contact 163. The core assembly 150 may additionally support a coil 166 having an aperture 170. In the illustrated embodiment, the aperture 170 is configured to receive a portion of both the first and second conductor arms 158a, 158b.

Figure 7:
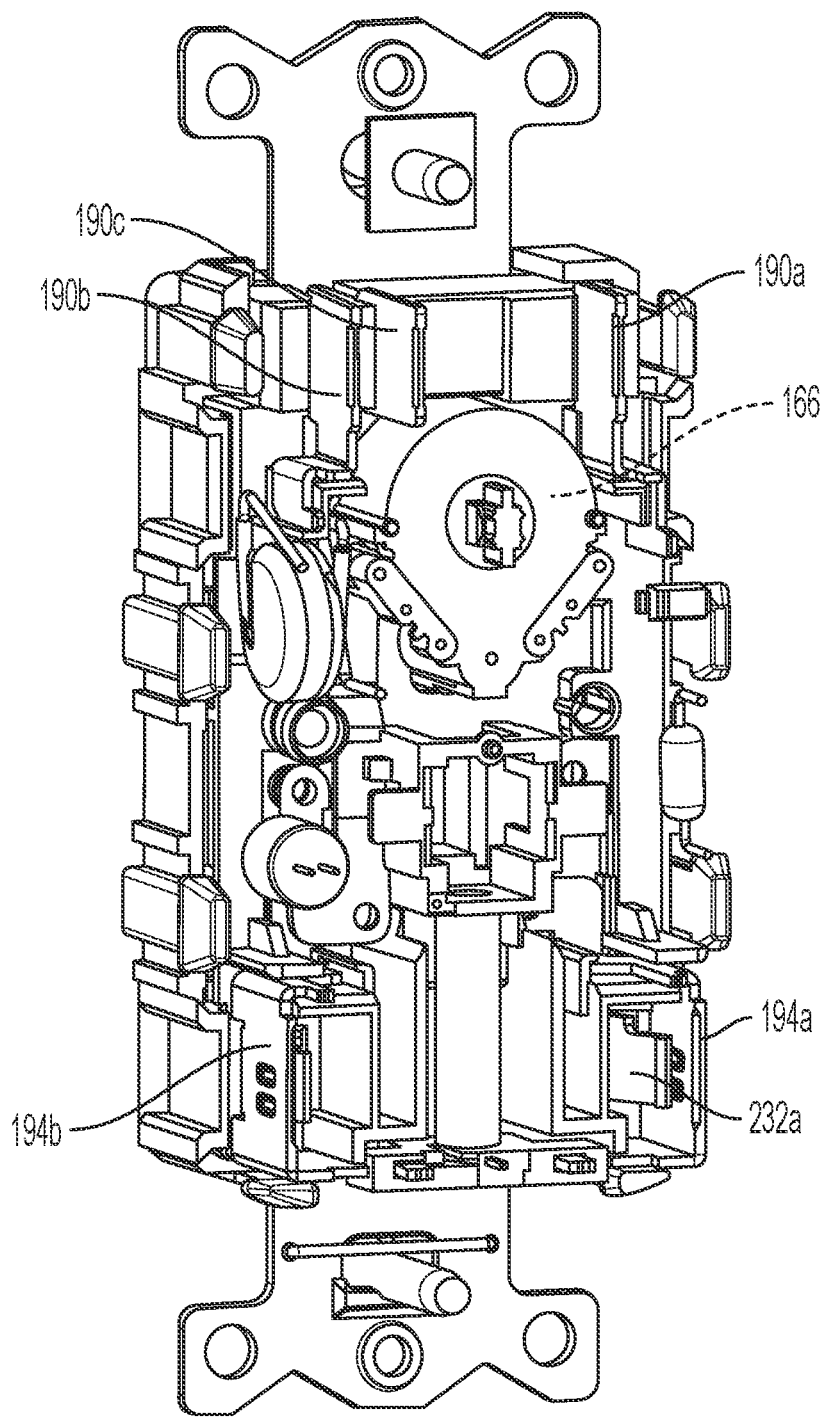
FIG. 7 is a rear perspective view of a core assembly of the receptacle of FIG. 1.
Figure 8A:
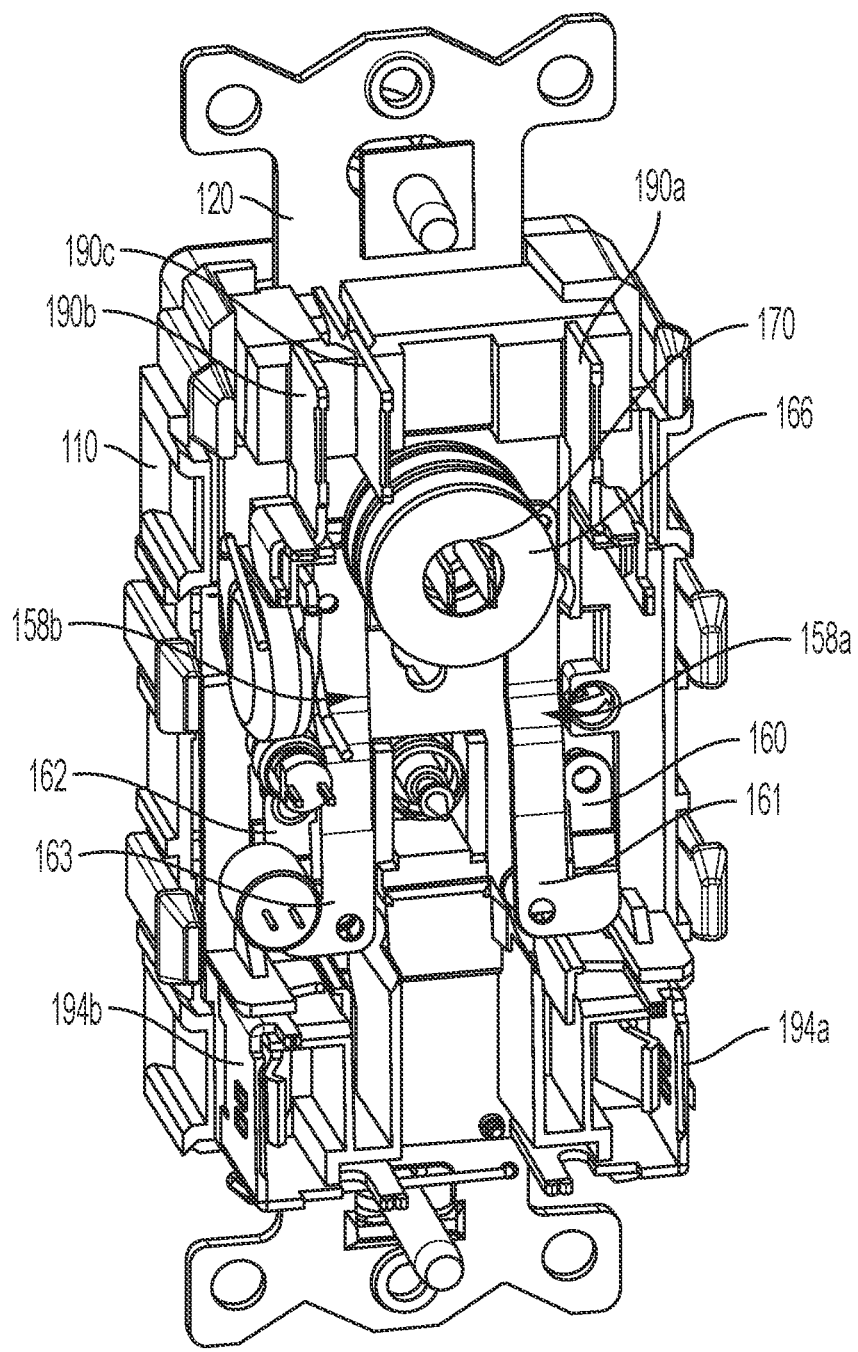
FIG. 8A is another rear perspective view of the receptacle of FIG. 1 with the rear cover and a printed circuit board removed.
Figure 8B:
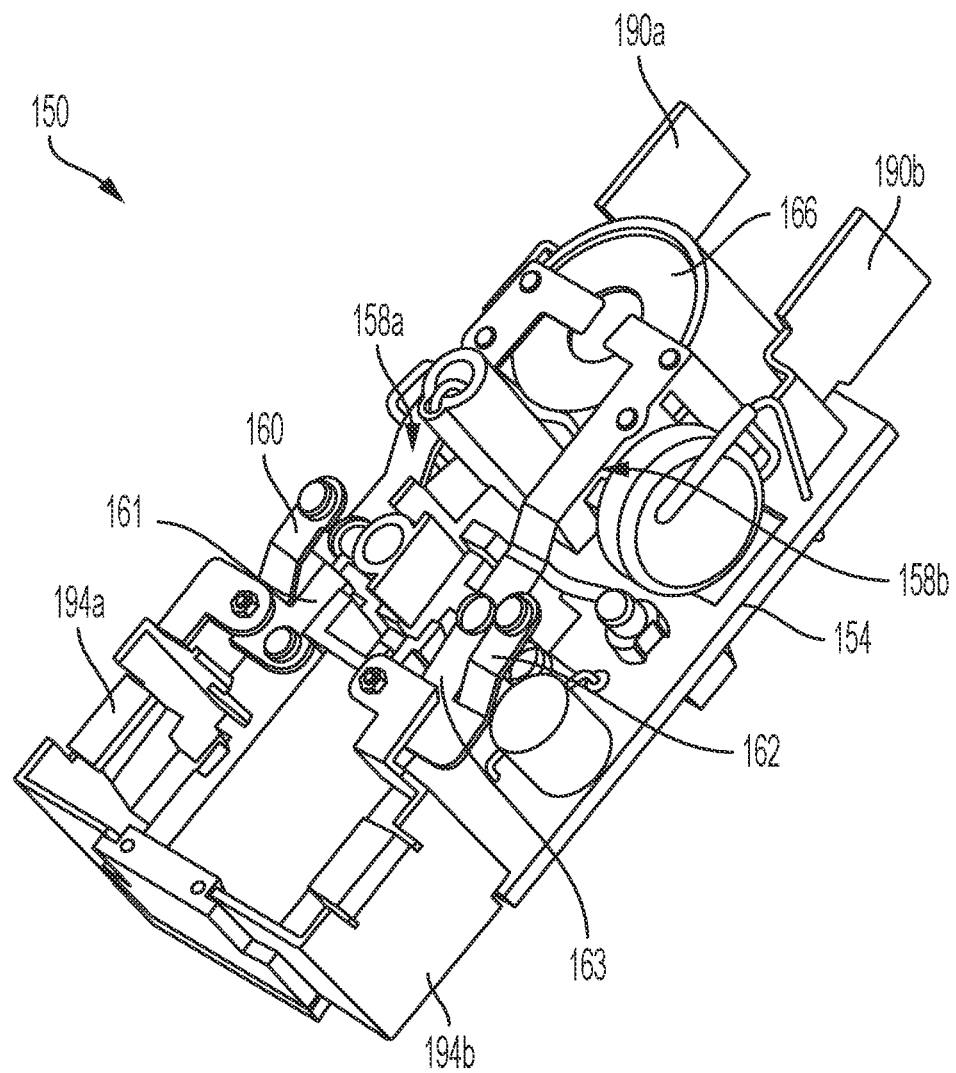
FIG. 8B is a front perspective view of a core assembly of the receptacle of FIG. 1.

The barrier 110 furthers supports a plurality of terminals. The term terminal, as used herein, means a component that conducts current to or from an electric circuit. The plurality of terminals includes a first set of terminals 182a, 186a (FIG. 5) and a second set of terminals 182b, 186b (FIG. 5) are on opposite sides of the barrier 110 (and therefore the receptacle 10) from a third set of terminals 190a, 190b, 190c (FIGS. 7 and 8) and a fourth set of terminals 194a, 194b (FIGS. 7 and 8).

Each of the first and second sets of terminals 182a, 186a, 186a, 186b are output line face terminals and include a hot line face terminal 182a, 186a and a neutral line face terminal 182b, 186b. In particular, the hot line face terminals 182a, 186a are integrally formed with (or otherwise coupled to) and extend from a hot face contact 187 and the neutral line face terminals 182b, 186b are integrally formed with (or otherwise coupled to) and extend from a neutral face contact 188. As shown in FIG. 5, each of the first and second sets terminals are female terminals that are formed from two or more beams 189. The first set of terminals 182a, 182b and the second sets of face terminal 186a, 186b are, respectively, configured to receive the mating male terminals of a plug of a device (not shown) and output electric power to the device. The hot line contact 160 and neutral line contact 162 are cantilevered and in selective electrical and physical communication with the respective hot face contact 187 and the neutral face contact 188.

The third set of terminals 190a, 190b, 190c are input blade (e.g., male) terminals that are accessible through the first aperture 70. The third set of terminals 190a, 190b, 190c include a hot line terminal 190a, a neutral line terminal 190b, and a ground terminal 190c. The line terminal 190a and the neutral terminal 190b are in electrical communication (e.g., via the printed circuit board 154) with the respective line and load conductor arms 158a, 158b. Each of the third set of terminals 190a, 190b, 190c are in electrical communication with the printed circuit board 154 and configured to input electrical power for a power source to the receptacle from a power source, as will be discussed in greater detail below.

Figure 9:
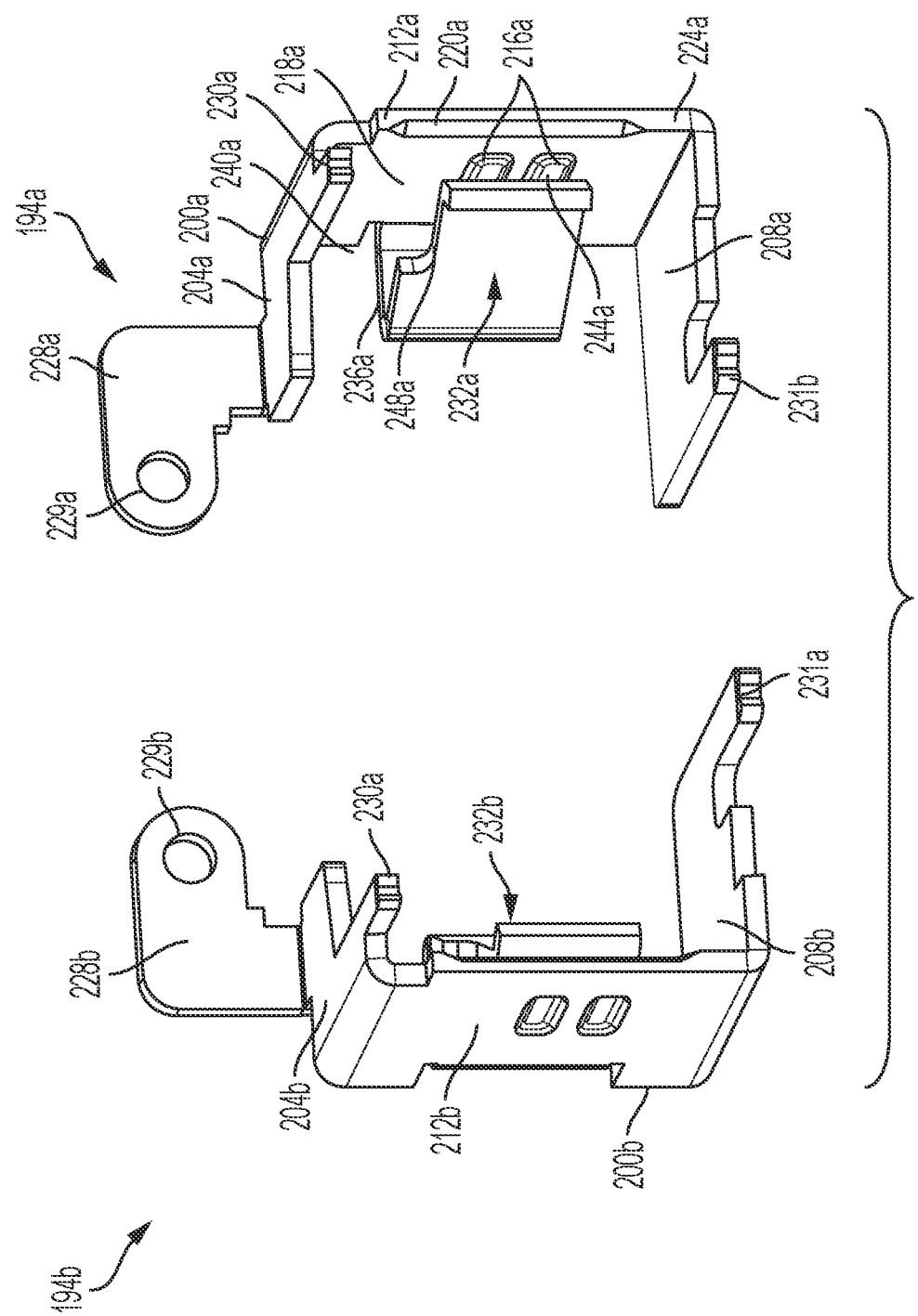
FIG. 9 is a perspective view of terminals of the receptacle of FIG. 1.
Figure 10:
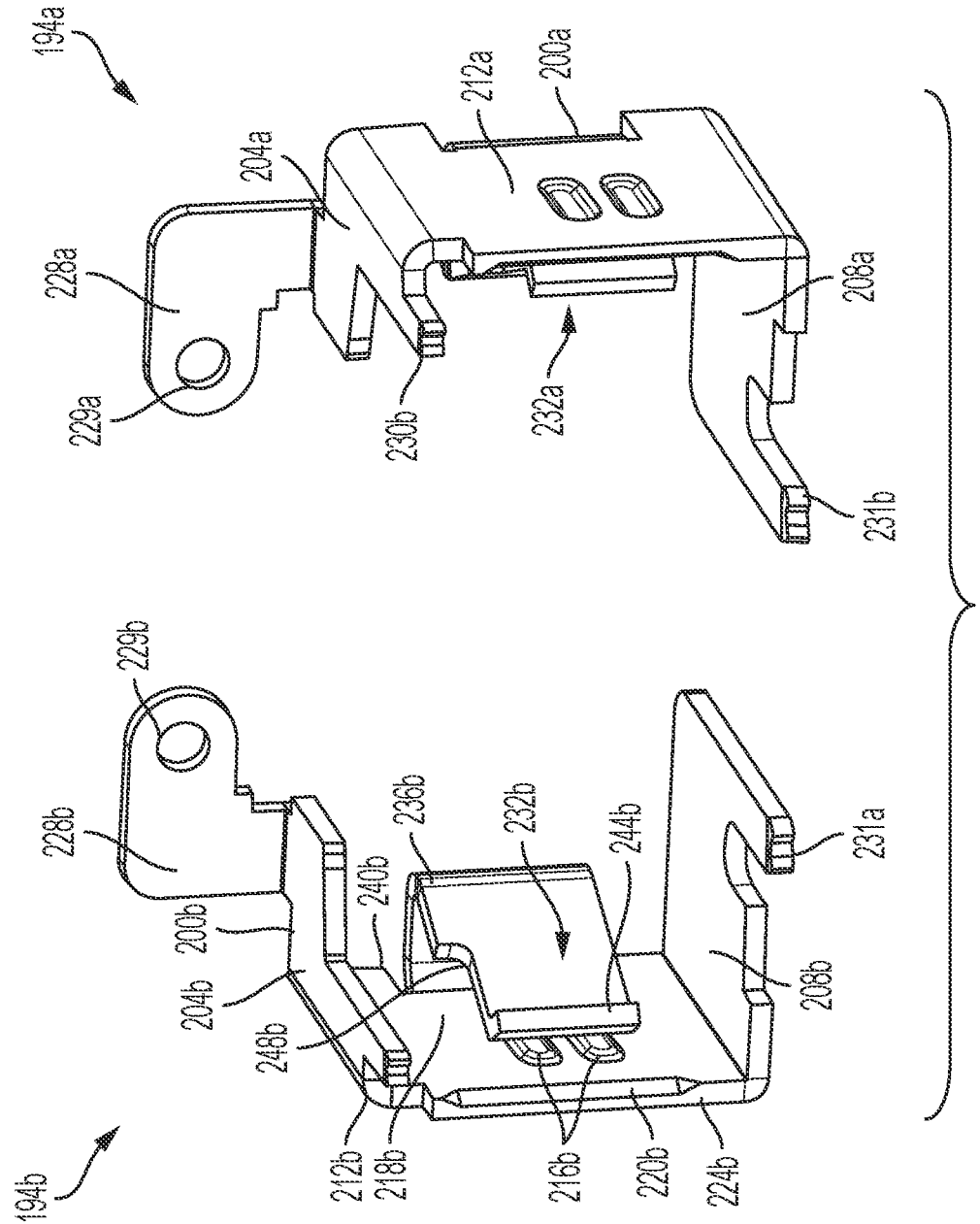
FIG. 10 is another perspective view of terminals of the receptacle of FIG. 9.

The fourth set of terminals 194a, 194b are output load terminals and are accessible through respective apertures 78a, 78b in the rear cover 38. The fourth set of terminals are configured to provide ground fault protection to one or more downstream devices, as will be discussed in greater detail below. The fourth set of terminals 194a, 194b include a hot load terminal 194a and a neutral load terminal 194b. The hot load contact 161 and neutral load contact 163 are cantilevered and in selective electrical and physical communication with the respective hot load terminal 194a and neutral load terminal 194b. With respect to FIGS. 9 and 10, the fourth set of terminals 194a, 194b are positioned on opposite sides of the core assembly 150 and are in electrical communication with the printed circuit board 154. The hot load terminal 194a and the neutral load terminal 194b are mirror images of one another, and therefore include the same features, although only the hot load terminal 194a is described in detail herein.

The hot load terminal 194a includes a body 200a that has a first portion 204a and a second portion 208a positioned on and integrally coupled with a central portion 212a. The central portion 212a includes gussets 216a on one surface 218a and a recess or chamfered edge 220a that extends along a first edge 224a (e.g., distal edge). Terminal arms 228a are coupled to and extend from the first portion 204a and include an aperture 229a for mounting and electrically coupling the hot load contact 161 thereto. First and second legs 230a, 231a that extend respectively from the first and second portions 204a, 204b electrically couple the hot load terminal 194a to the printed circuit board 154. A beam configured as a biasing member 232a (e.g., spring) is coupled to the body 200a. In particular, the beam 232a includes a first end 236a that is coupled to and extends from a second edge 240a (e.g., proximal edge) of the central portion 212a of the body 200a and a second end 244a that is positioned adjacent the surface 218a. The beam 232a is biased towards the surface 218a. The beam 232a further includes a cut-out 248a on one edge. The beam 232a and the surface 218a of the central portion 212a defines a female terminal. The cut-out 248a is positioned adjacent to the bend between a first end and a second end of the first aperture 78a.

With respect to FIG. 1, the first connector 14 is coupled (e.g., by a snap fit connection) the receptacle 10 and the second connector 18 is coupled (e.g., by a snap fit connection) to the receptacle 10.

Figure 11:
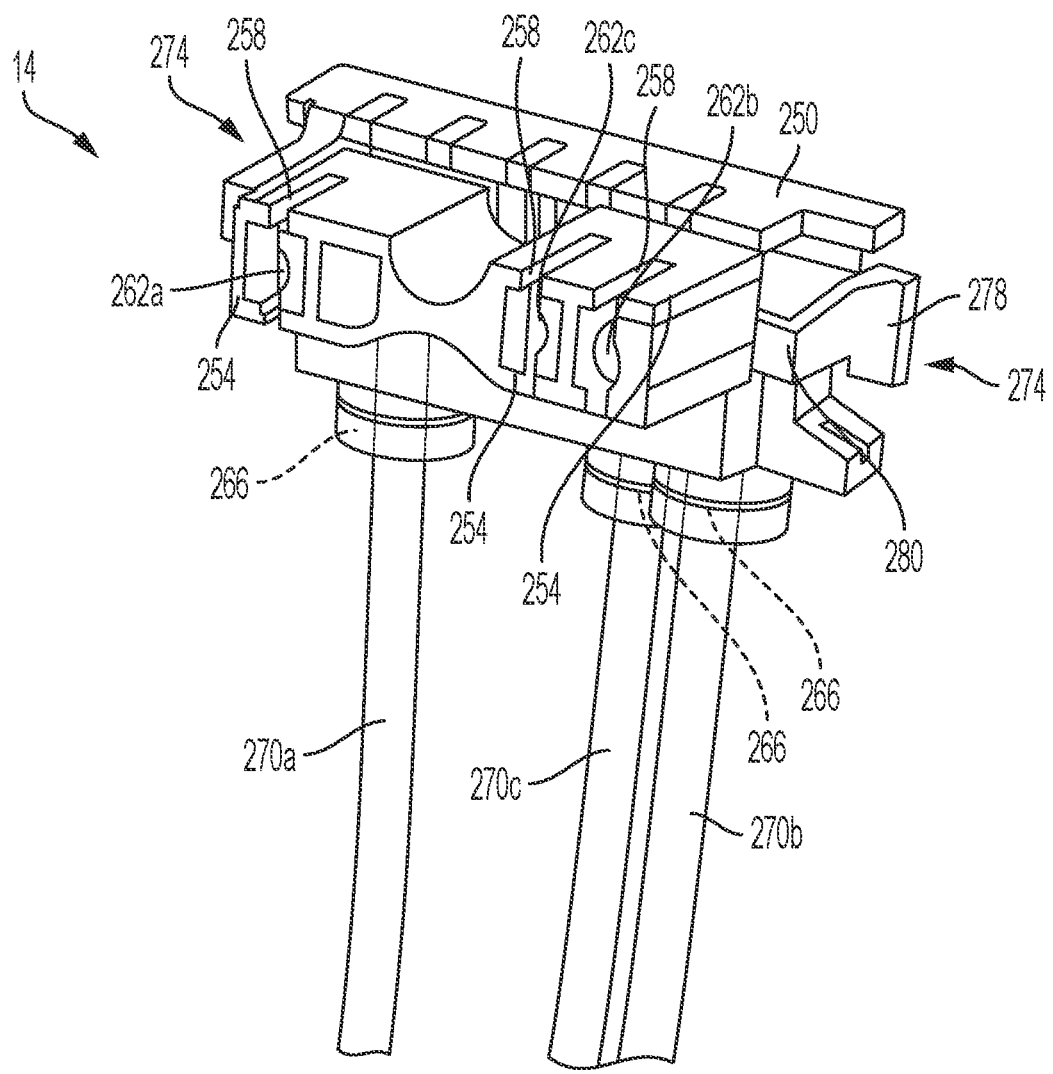
FIG. 11 is a perspective view of the first connector of FIG. 1.
Figure 12:
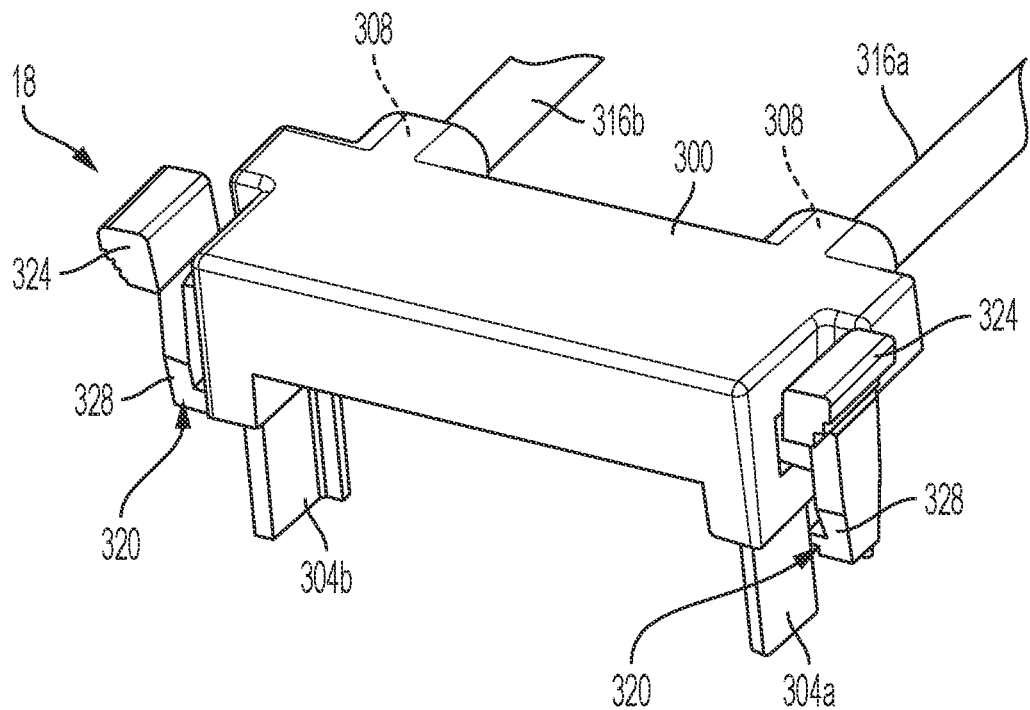
FIG. 12 is a perspective view of the second connector of FIG. 1.
Figure 13:
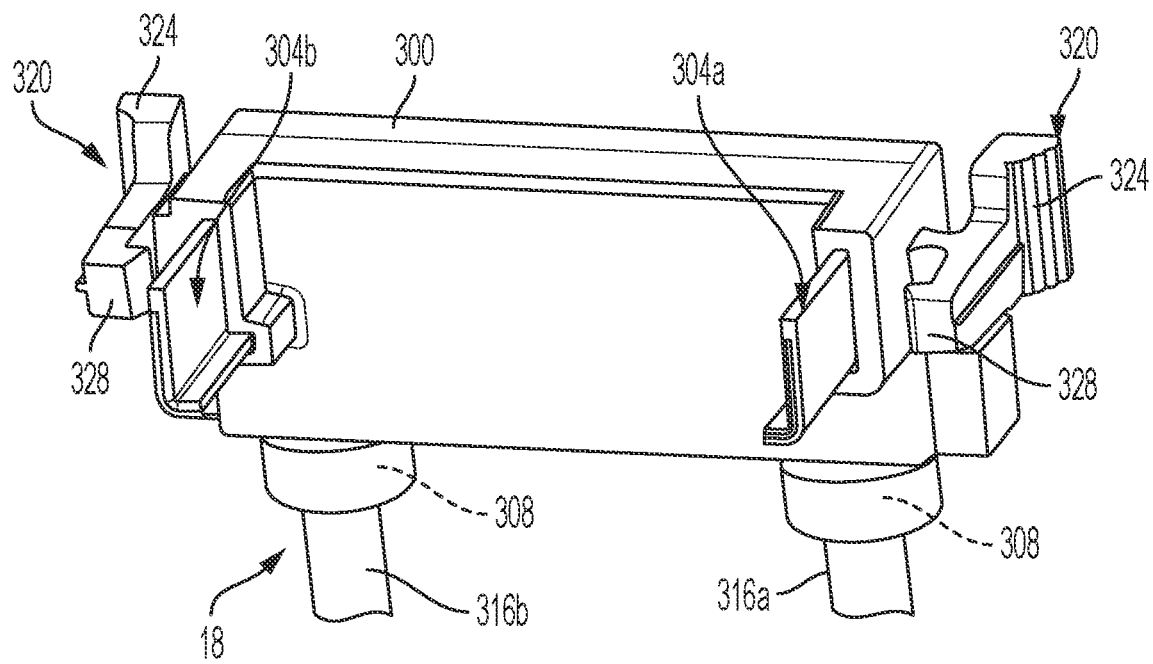
FIG. 13 is another perspective view of the second connector of FIG. 1.
Figure 14:
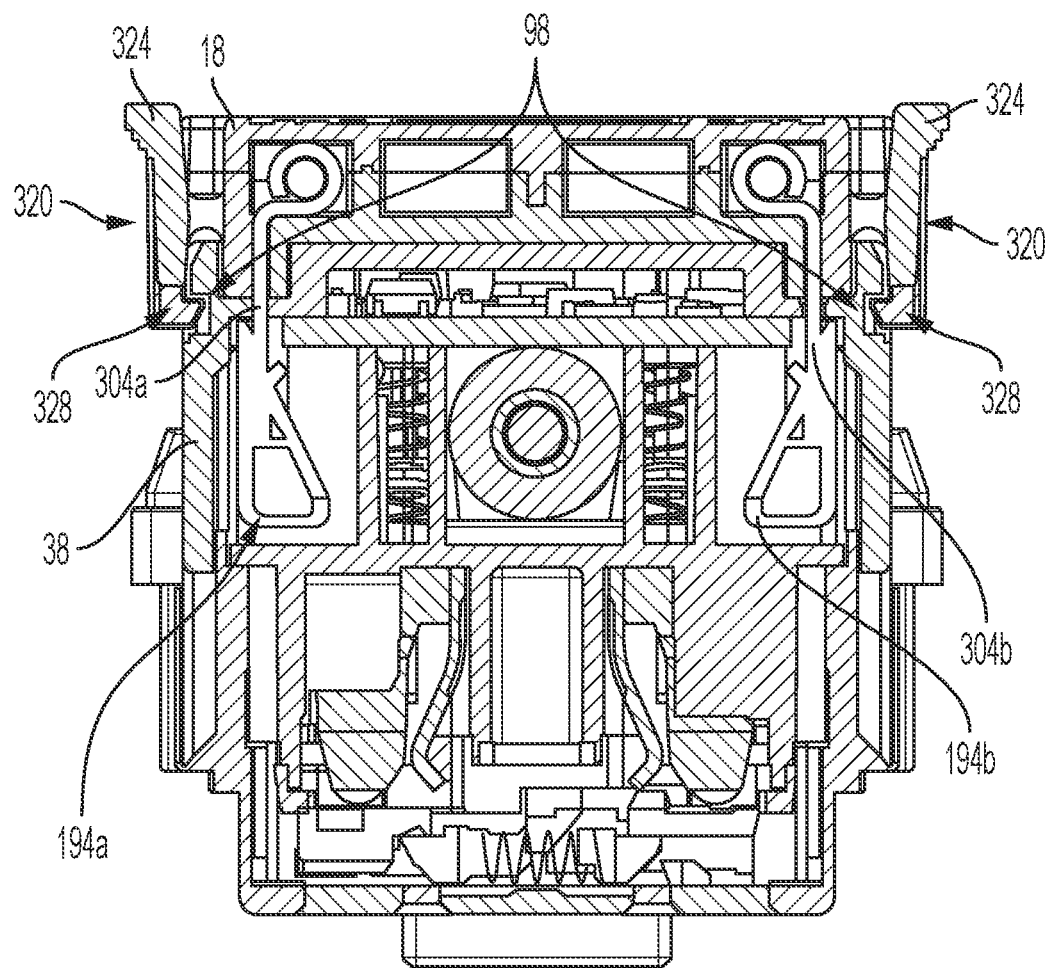
FIG. 14 is a cross-sectional view of the receptacle and second connector of FIG. 1 along the line 14-14 of FIG. 1.

The first connector 14 is shown in FIGS. 1 and 11. The first connector 14 includes a body 250 from which a plurality of projections 254 extend. Each of the projections 254 has a channel 258 that provides access to a female terminal positioned therein. Accordingly, there are three female terminals 262a, 262b, 262c (only a portion of each is shown). The female terminals 262a, 262b, 262c include a hot line terminal 262a, a neutral line terminal 262b and a ground terminal 262c. The body 250 further includes a plurality of apertures 266 that each receive a wire. One of the apertures 266 receives a hot line wire 270a, one of the apertures 266 receives a neutral line wire 270b, and one of the apertures 266 receives a ground wire 270c. The hot line wire 270a is in electrical communication with the hot line terminal 262a, the neutral line wire 270b is in electrical communication with the neutral line terminal 262b, and the ground wire 270c is in electrical communication with the ground terminal 262c. A first latch 274 is positioned on a first side of the body 250, and a second latch 274 is positioned on a second, opposite side of the body 250. Each of the latches 274 includes an actuator 278 and a latch member 280.

The second connector is shown in FIGS. 1 and 12-14. The second connector 18 includes a body 300 from which male terminals or blade terminals 304a, 304b extend. In particular, the body 300 includes a first body portion 312a that receives a portion of the blade 304a, 304b and from which the blades 304a, 304b extend and a second portion 312b that is coupled (e.g., ultrasonically welded) to the first body portion 312b. The male terminals 304a, 304b are substantially L-shaped and include a hot load terminal 304a and a neutral load terminal 304b. As shown, each of the terminals 304a, 304b have a substantially 90 degree bend between a first end and a second end thereof. The body 300 further includes a pair of apertures 308 that each receive a wire 316. One of the apertures 308 receives a hot load wire 316a and one of the apertures 308 receives a neutral load wire 316b. The hot load wire 316a is in electrical communication with the hot load terminal 304a and the neutral load wire 316b is in electrical communication with the neutral load terminal 304b. A first latch 320 is positioned on a first side of the body 300, and a second latch 320 is positioned on a second, opposite side of the body 300. Each of the latches 320 includes an actuator 324 and a latch member 328.

The first connector 14 is removably coupleable to the receptacle 10. In particular, the female terminals 262a, 262b, 262c of the first connector 14 are each configured to receive the respective terminal of the third set of terminals 190a, 190b, 190c, and the latch member 280 of the latch mechanisms 274 are received in a respective pockets 86 in the sides 90, 94 of the rear cover 38. The first connector 14 couples electric power from a power source to the receptacle 10. The second connector 18 is also removably coupleable to the receptacle 10. In particular, the male L-shaped terminals 304a, 304b of the second connector 18 are configured to be inserted into the respective female terminals of the fourth set of terminals 194a, 194b. The recesses 220a facilitates lead in of the respective L-shaped terminals 304a, 304b. The L-shape of the terminals 304a, 304b and the respective aperture 78a, 78b create a key feature. That is, the apertures 78a, 78b will not receive any terminals, but only the terminals 304a, 304b having the proper L-shape of the connector 18. Accordingly, the L-shape of the apertures 78a, 78b ensures other connectors will not mistakenly be coupled to the receptacle. The cut-out 248a, 248b in the beams 232a, 232b also accommodates the L-shape of the terminals 304a, 304b, and ensures that terminals 304a, 304b properly mate and electrically communicate with the respective load terminals 194a, 194b.

Further, the beams 232a, 232b and gussets 216a, 216b (which add contact pressure) ensure a proper electrical connection with the terminals 304a, 304b of the second connector 18. Also, the latch member 328 of the latch 320 are received in a respective pockets 98 in the sides 90, 94 of the rear cover 38. The second connector 18 couples the receptacle 10 to the downstream devices to provide ground fault protection to downstream devices. Notably, the first and second connectors 14, 18 are not interchangeable. To remove either the first connector 14 or the second connector 18 from the receptacle 10, the user depresses or actuates the actuator 378, 324 of each of the latch 274, 320 to pivot the latch member 280, 324 out of the respective pocket 86, 98 in the rear cover 38.

Although the disclosure has been described with reference to certain preferred aspects, variations and modifications exist within the scope and spirit of one or more independent aspects of the disclosure as described. Various features and advantages of the disclosure are set forth in the following claims.

What is claimed is:

1. A connector for use with a GFCI receptacle, the connector comprising:
   a body;
   a latch configured to couple the body to the GFCI receptacle;
   a first blade supported by and extending from the body;
   a second blade supported by and extending from the body;
   wherein when the body is coupled to the GFCI receptacle,
     the first blade is received by a first mating terminal of the GFCI receptacle and the second blade is received by a second mating terminal of the GFCI receptacle to electrically couple the receptacle to a downstream device, and wherein each of the first and second blades includes a key feature, the key feature configured to allow the first blade and the second blade to be received in and electrically couple to the respective first and second mating terminals of the GFCI receptacle.

2. The connector of claim 1, wherein each of the first and second blades are L-shaped.

3. The connector of claim 1, wherein each of the first and second blades include a first end, a second end, and a bend between the first end and the second end.

4. The connector of claim 1, further comprising a first wire extending from the body and in electrical communication with the first blade, and a second wire extending from the body and in electrical communication with the second blade, the first and second wires configured to electrically communicate with a downstream device.

5. A receptacle comprising:
a housing enclosing a circuit interrupting device, the housing including a front cover having a duplex outlet face and a rear cover, the rear cover having a first aperture and a second aperture;
one or more first sets of terminals positioned within the housing and accessible through duplex outlet face;
a second set of terminals positioned within the housing and configured to input electrical power to the receptacle from a power source;
a third set of terminals positioned within the housing, the third set of terminals configured to provide ground fault protection to a downstream device, the third set of terminals including a first terminal being accessible through the first aperture and a second terminal being accessible through the second aperture.

6. The receptacle of claim 5, wherein each of the first and second terminals is a female terminal including a body, a beam coupled to and biased toward the body, and a cut out on an edge of the beam.

7. The receptacle of claim 6, wherein each of the first and second apertures includes a first end, a second end, and a bend between the first end and the second end, the bend being positioned adjacent the cut out.

8. The receptacle of claim 5, wherein each of the first and second apertures is L-shaped.

9. The receptacle of claim 5, wherein each of the first and second apertures includes a first end, a second end, and a bend between the first end and the second end.

10. A receptacle assembly comprising:
a housing enclosing a circuit interrupting device, the housing including a front cover having a duplex outlet face and a rear cover, the rear cover having a first aperture and a second aperture;
one or more first sets of terminals positioned within the housing and accessible through duplex outlet face;
a second set of terminals positioned within the housing and configured to input electrical power to the receptacle from a power source;
a third set of terminals positioned within the housing, the third set of terminals configured to provide ground fault protection to a downstream device, the third set of terminals including a first terminal being accessible through the first aperture and a second terminal being accessible through the second aperture; and
a connector removably coupleable to the housing to electrically couple the receptacle to one or more downstream devices, the connector including a first terminal and a second terminal, the first terminal being complementary to one of the first and second terminals of the third set of terminals and the second terminal being complementary to the other of the first and second terminals of the third set of terminals.

11. The receptacle assembly of claim 10, wherein the connector includes a body and a latch configured to couple the body to the housing, each of the first terminal of the connector and the second terminal of the connector supported by and extending from the body.

12. The connector of claim 11, wherein each of the first and second terminals of the connector are L-shaped blade terminals.

13. The connector of claim 11, wherein each of the first and second terminals of the connector are blade terminals including a first end, a second end, and a bend between the first end and the second end.

14. The connector of claim 11, further comprising a first wire extending from the body and in electrical communication with the first terminal of the connector, and a second wire extending from the body and in electrical communication with the second terminal of the connector, the first and second wires configured to electrically communicate with a downstream device.

15. The receptacle assembly of claim 10, wherein each of the first and second terminals of the third set of terminals is a female terminal including a beam and a cut out on an edge of the beam.

16. The receptacle assembly of claim 15, wherein each of the first and second apertures includes a first end, a second end, and a bend between the first end and the second end, the bend being positioned adjacent the cut out of the respective first and second terminals of the third set of terminals.

17. The receptacle assembly of claim 16, wherein each of the first and second terminals of the connector are blade terminals including a first end, a second end, and a bend between the first end and the second end, and wherein the first end, the second end, and the bend of each of the first and second terminals of the connector are complementary to the first end, the second end, and the bend of the respective first and second apertures.

18. The receptacle assembly of claim 10, wherein each of the first and second apertures is an L-shaped aperture and each of the first and second terminals of the connector is L-shaped blade terminal.

19. The receptacle assembly of claim 10, wherein
each of the first and second apertures includes a first end, a second end, and a bend between the first end and the second end, and
each of the first and second terminals of the connector are blade terminals including a first end, a second end, and a bend between the first end and the second end, and
the first end, the second end, and the bend of each of the first and second terminals of the connector being complementary to the first end, the second end, and the bend of the respective first and second apertures.

20. The receptacle assembly of claim 10, wherein the connector is a first connector and further comprising a second connector, the second connector being removably coupleable to the housing to couple electric power to the receptacle, the first connector including a plurality of terminals, each of the plurality of terminals being complementary to one of the second set of terminals.

* * * * *